Feb. 7, 1961

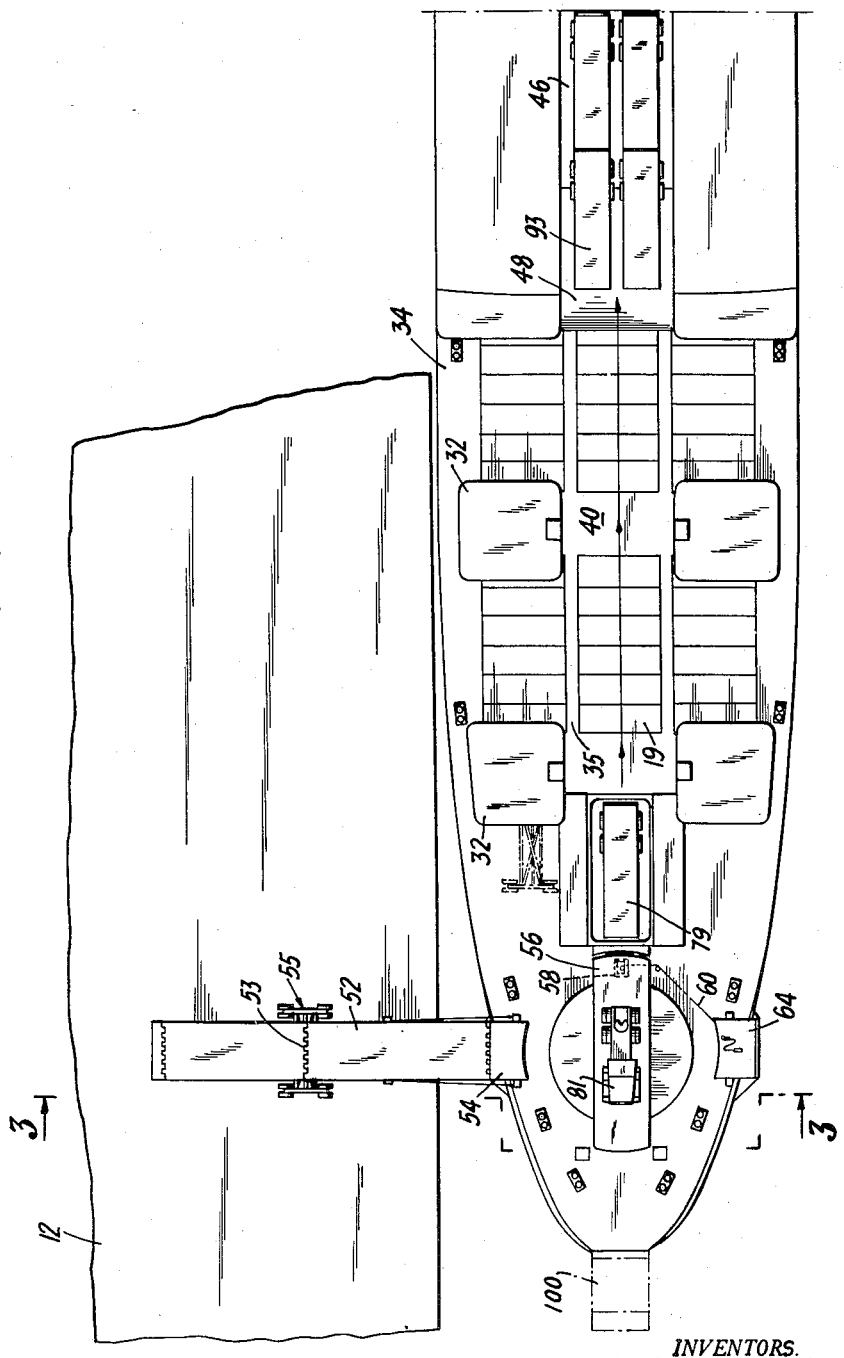

C. M. DE WITT, JR., ET AL 2,970,705

CARGO SHIPS

Filed Feb. 25, 1959

INVENTORS.
CLARENCE M. DEWITT, JR. &
PAUL E. KINGSTON
BY

ATTORNEYS.

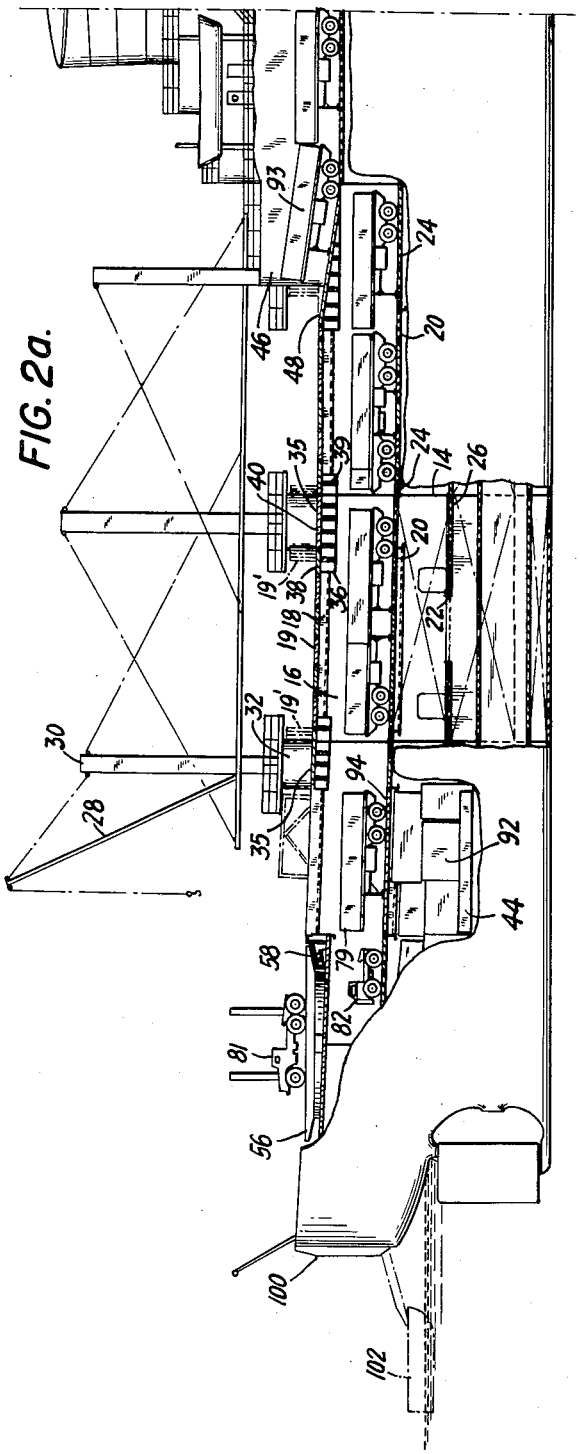

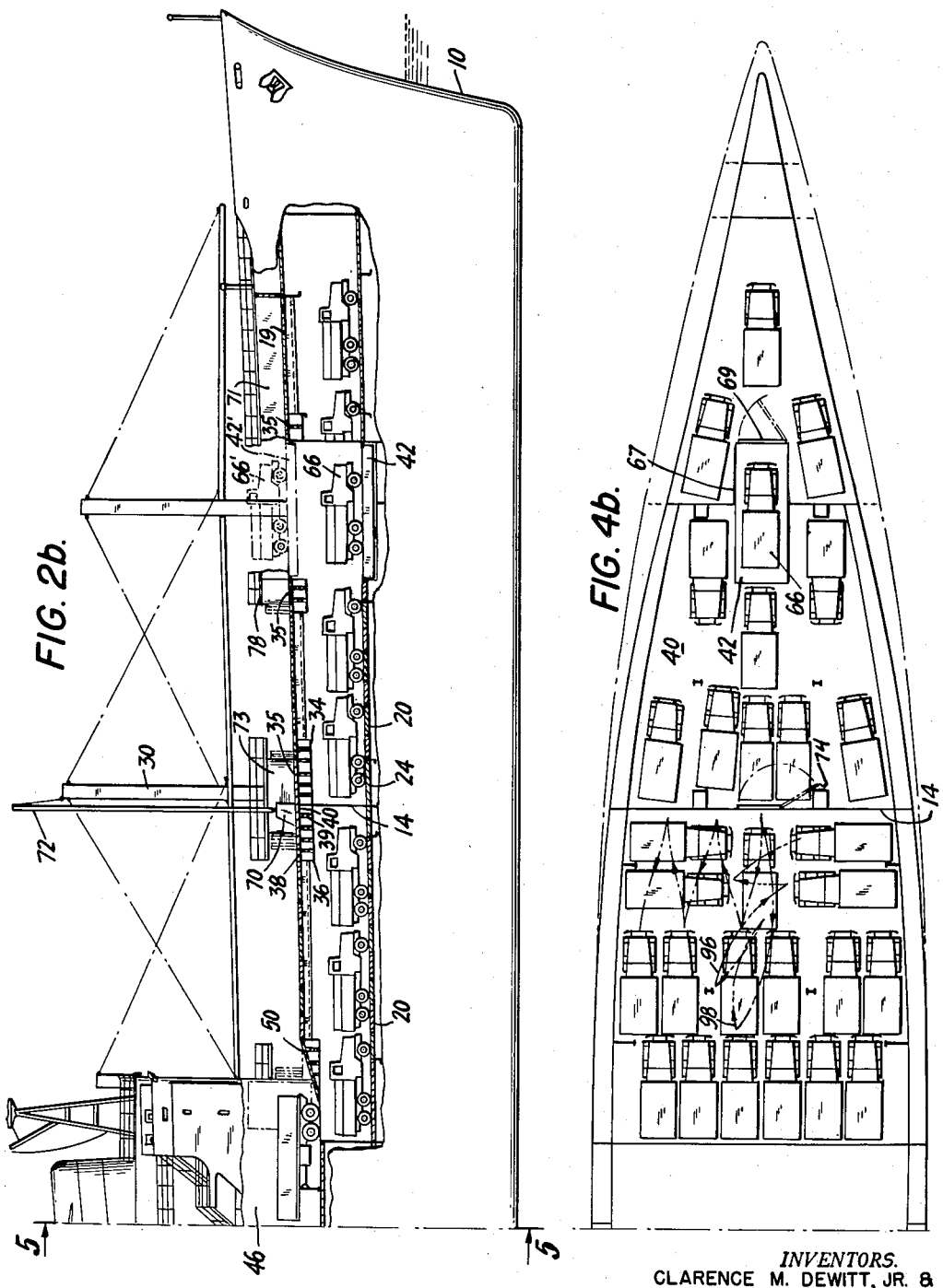

Feb. 7, 1961     C. M. DE WITT, JR., ET AL     2,970,705
CARGO SHIPS
Filed Feb. 25, 1959                                           5 Sheets-Sheet 5

INVENTORS.
CLARENCE M. DEWITT, JR. &
PAUL E. KINGSTON
BY

ATTORNEYS.

United States Patent Office 2,970,705
Patented Feb. 7, 1961

2,970,705

CARGO SHIPS

Clarence M. De Witt, Jr., Bellerose, and Paul E. Kingston, New York, N.Y., assignors to United States Lines Company, New York, N.Y., a corporation of New Jersey Filed Feb. 25, 1959, Ser. No. 795,427

9 Claims. (Cl. 214—14)

This invention relates to cargo vessels and, more particularly, to cargo vessels capable of ramp loading of wheeled vehicles.

It is desirable that cargo ships be capable of ramp loading vehicles such as loaded trucks and trailers. Ramp loading of vehicles is considered to offer greater speed in loading and unloading of the vehicles. For some purposes such loading may be desirable, even though conventional loading by cargo slings may result in more efficient utilization of available cargo space.

Heretofore, vessels have been specifically designed for ramp loading of vehicles, but such vessels have not been well adapted to the storage of general cargo. Thus when such vessels are used for the transportation of general cargo, they cannot economically complete with the efficiently designed, high-speed cargo ships in current use.

It is, therefore, an object of this invention to provide a fine cargo vessel capable of ramp loading vehicles which is also well adapted for the transportation of general cargo.

It is a further object of my invention to provide a cargo vessel which can utilize tween deck storage area for the efficient storage of either loaded vehicles or general cargo.

Further objects and advantages of this invention will appear hereinafter.

A preferred embodiment of the invention is illustrated in the accompanying drawings in which:

Figure 2 is a partially sectioned profile view of a cargo vessel embodying this invention, separated into views 2a and 2b showing the aft and forward profiles respectively.

Figure 4 is a plan view of the tween deck storage compartments showing vehicles stored therein, separated into views 4a and 4b showing the aft and forward plans respectively.

Figure 3:
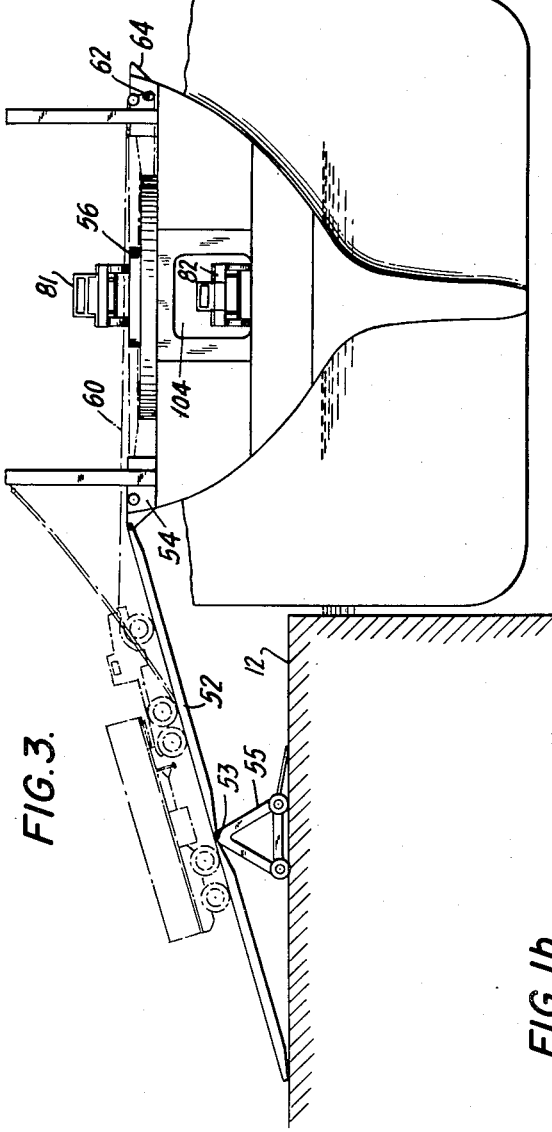
Figure 3 is a section through Figure 1.
Figure 1B:
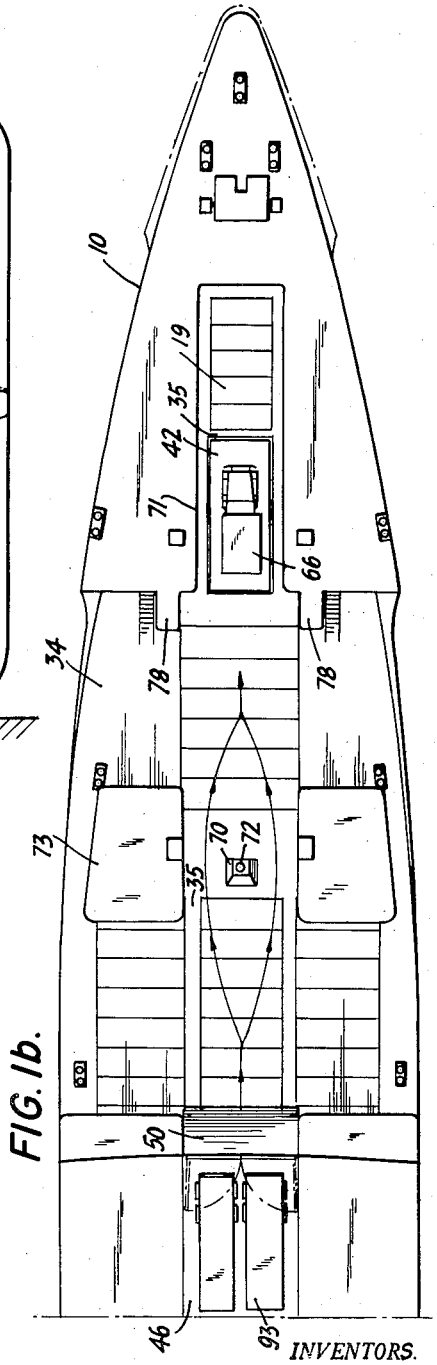
Figure 1 is a plan view of the main deck of a cargo vessel embodying this invention, separated into views 1a and 1b which are plan views of the aft and forward main deck respectively.
Figure 5:
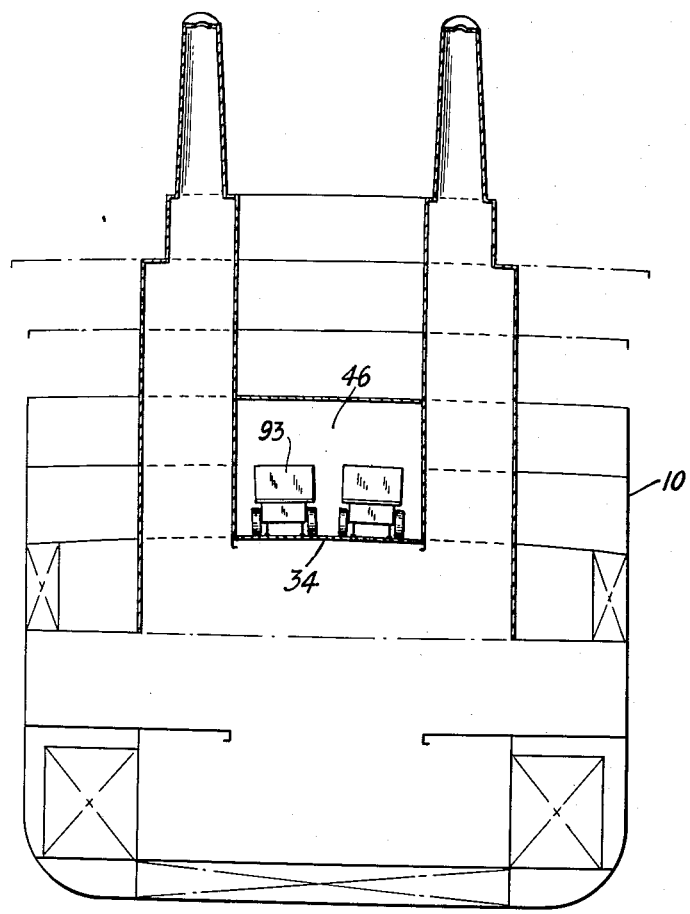
Figure 5 is a section through Figure 2.

Referring to the figures there is shown a cargo vessel 10 in loading position adjacent a pier 12. The vessel is divided into compartments by water-tight vertical bulkheads 14 and horizontal tween decks. Access to the upper tween storage compartment 16 is provided by a hatch 18 closed by a removable hatch cover. The hatch cover comprises a plurality of sections 19. For access, the hatch cover sections may be moved individually or may be hinged together and folded up accordion fashion as shown in outline 19' by hydraulically operated mechanism. Similarly, access to the lower tween and hold compartments are provided respectively by hatches 20 and 22 and in the tween decks 24 and 26. Cargo is loaded in the hold and lower tween compartments in normal fashion by cargo slings carried by the booms 28. Kingposts 30 and the machinery on top of the winch house 32 co-operate to support and move the booms.

To enable loaded vehicles to move along the strength deck 34, a runway is provided. The runway comprises raised deck 35 extending between adjacent hatches. The raised deck contacts the periphery of the hatch coamings 36 and is flush with the surface of the hatch covers. The raised deck may be constructed of ribs 39 extending across the strength deck in supporting engagement with conventional deck plates 40. Also, the raised deck may be constructed of supported gridwork to save weight since the raised deck is not employed for structural strength.

To move loaded vehicles from the runway to the tween deck storage areas, a forward elevator 42 and an aft elevator 44 are provided. To allow direct vehicular movement between the forward and aft elevators, the runway is extended through a tunnel 46 in the deckhouse. The runway through the tunnel way be constructed in the same manner as the raised deck and may be flush therewith to allow vehicle movement over a continuous runway surface. On occasion due to the height of the vehicles to be loaded or restrictions on the deckhouse tunnel height, the strength deck may be employed as a portion of the runway. In such cases ramps 48 and 50 provide a gradual incline to the strength deck 34 from the hatch covers of the No. 3 and 4 amid-ship hatches respectively. Each ramp 48 and 50 contacts the hatch coaming and is contiguous to the hatch cover and raised deck to form a surface suitable for vehicle movement thereover. The ramp may be constructed in fashion similar to the construction of the raised deck.

The forward elevator is positioned between No. 1 and No. 2 hatch and is operable between the stowed position 42 and a raised position 42' where it forms a portion of the runway for receiving vehicles. The aft elevator 44 communicates between the runway and the tween decks. Since the aft elevator is located in the No. 6 hold, the stowed position (as shown) is at the bottom of the hold where cargo may be stored thereon.

To ramp load vehicles, the loaded vehicles can be driven aboard over ramp or gangway 52, hingedly connected to the port desk platform 54. For ease in stowing the gangway aboard ship, it is foldable at the hinged connection 53 which is supported by a wharf dolly 55. A turntable having an elongated platform 56 flush with the runway is rotatably mounted in the stern of the ship contiguous to the runway and the gangway. The vehicle to be loaded is driven on the turntable platform which then is rotated into axial alignment with the runway.

Under conditions of high tide the pitch of the gangway may be greater than that capable of being negotiated by loaded vehicles operated under their own power alone. A winch 58, assists in loading vehicles, acting through cable 60 which passes through pulley 62 in the aperture of the starboard deck platform 64. After the turntable has received the loaded vehicle, it is rotated into axial alignment with the runway so that the vehicle can drive along the runway to the desired elevator. When the gangway is swung from the starboard platform 64, the cable 60 is passed through the port platform for loading assistance.

When the cargo ship is to be loaded, the holds and the lower tween storage compartments of hatches Nos. 1–5 are loaded through the access hatches by cargo slings in conventional fashion. Subsequently, the flush hatch covers 20 are placed in the tween deck 24 to provide an upper tween compartment 16 in which vehicles can be moved and stored.

In the embodiment shown provision is made for storage of loaded trucks in the forward tween deck compartments of the vessel and for loaded trailers in the aft tween deck compartments. This provision is made for maximum utilization of space in the normal division of vehicles between trucks and trailers. It will, however, be understood that trucks may be stored in the aft compartments as well as the forward compartments and that trailers may be stored in the forward compartments as well as in the aft compartments.

To store the vehicles in the forward compartment, the aft elevator 44 is raised to form a portion of the runway extending from the turntable 56 to the forward elevator 42. Alternatively, a hatch cover may be placed across the elevator shaft hatch to form the runway. A vehicle such as a truck 66 is driven up the gangway onto the turntable, and, after the turntable is rotated 90°, the truck is driven along the runway through the deckhouse tunnel to the raised forward elevator 42'. The forward elevator receives the truck 66'. The elevator is then lowered to the level of the tween deck shown as 42 in Figure 2. In order to provide access to the tween deck compartment of the No. 3 hold a hinged water-tight door 74 is provided in the bulkhead 14. The compartment may be filled with trucks as illustrated in Figure 4 which also shows illustrative loading patterns 96 and 98. In traversing the runway, ample access for by-passing the footing 70 of the heavy weight loading boom 72 is provided between the footing and the winch housing 73. It will be noted that the cargo booms 28 with their associated kingposts 30 and winch houses 32 are positioned on each side of the strength deck to provide an unobstructed center line runway. However, the heavy weight loading boom 72 is used so infrequently, that the provision for a boom on each side of the ship is not economically justified for most applications. Where such provision is required, it will be apparent to those skilled in the art that a heavy weight loading boom can be provided on each side of the main deck of the vessel to provide a centerline runway.

When the tween deck storage compartment of hatch No. 3 is completely filled, the water-tight door 74 is secured and the tween deck storage compartment of hold No. 2 is loaded with vehicles.

To further enhance vehicle storage capabilities, the bulkhead 67 defining the elevator shaft is provided with a water-tight door 69 which can be opened for access to the tween deck storage compartment of hold No. 1. Vehicles may be stored in the No. 1 hold by movement through the door 69. The compartment is also available for storage of ordinary cargo, sling loaded through the deck hatch. After the storage compartments are filled and the doors secured, a vehicle may be loaded on the elevator 42, which is stowed in the lowered position. Hatch covers provide weather protection.

To provide the clearance for the vehicles, the forecastle deck is cut away over the elevator shaft hatch and the hatch for the No. 1 hold in a substantially U-shaped section 71.

When it is desired that trailers be loaded into the forward storage compartments, the trailer is positioned on the forward elevator by its associated tractor. The trailer is then removed from the tractor by means of the parking wheels and the tractor is driven onto the hatch cover of the No. 1 hold. To move the trailers into the tween deck storage compartments from the lowered elevator, a small tractor is provided as part of the ship's equipment, as is more fully explained in connection with the loading of the aft storage compartments.

Since trailers are normally loaded without their tractors, the elevators 44 and 42 are dimensioned only to accommodate the trailer for minimum disturbance of the ship design. In order to load the trailers of the semitrailers, the vehicle is driven up the gangway and positioned with both the trailer 79 and the tractor 81 on the turntable 56. The turntable is then rotated into axial alignment with the runway and the vehicle driven so that the trailer is positioned on an elevator, such as the aft elevator 44. The trailer is then removed from the tractor by means of the parking wheels and the trailer is lowered into the tween deck storage compartment as shown in Figure 2. In order to move the trailers into the storage compartments, a small tractor 82 is provided as a part of the ship's equipment. The trailers are first loaded into the No. 4 upper tween storage compartment by movement through the water-tight sliding doors 84 and 86 and the hinged door 88. In Figure 4 there is shown the stowed positions of the trailers and an illustrative loading pattern.

On completion of filling the upper tween compartment of the No. 4 hold, the water-tight doors are secured and the No. 5 upper tween compartment is similarly loaded with trailers through the hinged water-tight door 90.

In order to fully utilize available cargo storage capabilities, the last trailer stored in the tween deck compartments is moved forward into the position shown by the dotted outline 89, and the tractor 82 is disconnected therefrom and moved aft to clear the elevator compartment. The aft elevator is then lowered into stowage position 44. Cargo 92 is then loaded on top of the elevator. A flush hatch cover 94 is placed in the tween deck to accommodate the trailer 79 moved from position indicated by 89 and stowed thereon. The water-tight bulkhead door 90 may then be secured for transit. The hatch cover 94 may be constructed of separately removable sections or may be divided along the center line and hingedly connected to the tween deck.

To further enhance storage capabilities, trailers 93 may be stored in the deckhouse tunnel. The trailers are stored therein by being driven along the runway. It will be apparent to those skilled in the art that the deckhouse tunnel may also be used for the storage of deck cargo if the vessel is not used for the transport of vehicles. Similarly, it will be apparent to those skilled in the art that doors may be provided on the forward and aft end for weather protection of cargo stored therein.

Deck storage capability is further enhanced by the flush surface provided by the raised deck and the hatch covers. To utilize this capability, the vehicles will be first parked on the outboard hatch covers and contiguous raised decks, and the vessel then completely loaded by parking of vehicles on the amid-ship hatch covers and contiguous raised deck.

In some applications it is desirable that provision be made for unloading the ship onto a floating receiver such as a pontoon wharf. For such applications there is provided a stern ramp 100, hingedly connected at the stern of the ship and adapted to be dropped into unloading engagement with the pontoon wharf 102. A tunnel 104 communnicates between the stern ramp and the aft tween deck compartments. When the vehicles are unloaded over the stern ramp, the vehicles in the aft compartments may be moved directly to the stern ramp through the hinged bulkhead door 105. Vehicles in the forward compartment would be lifted by the forward elevator 42, driven along the runway and dropped to the level of the tween deck by aft elevator 44. To allow elevator movement for unloading, it will be recognized that any cargo 92 in No. 6 hold must be moved in order to operate the aft elevator. In time of war, however, this embodiment may offer sufficient advantages so that the cargo 92 in the No. 6 hold would be eliminated to enhance unloading speed.

The vehicles are unloaded from the ship to a pier over a gangway in opposite manner to that of loading.

During transit the gangway 52 is folded at the hinged joint 53, disconnected from the deck platform 54, and stowed fore and aft on top of the turntable 56. The dolly may be stowed on deck as shown in 55'.

Similarly, it will be apparent that the lower tween deck compartments may be utilized for vehicle storage. However, for transport of the number of vehicles shown in the illustrations, the use of the upper tween compartments is preferred. Not only does the use of the upper tween compartments for vehicle storage require less elevator travel and, thus, less interference with the storage of general cargo, but the total weight of loaded vehicles is inevitably less than the weight of the equivalent amount of the general cargo, dictating the use of the upper tween compartments for proper weight distribution.

It will be understood that this invention may be variously modified and embodied within the scope of the subjoined claims.

What is claimed is:

1. A cargo ship comprising a strength deck, tween deck storage compartments beneath said deck, a ramp, a runway extending along the deck, a turntable rotatably mounted on the deck contiguous to both said ramp and said runway, and elevator means operable between said runway and said tween deck storage compartments, said deck being provided with a plurality of hatch coamings defining hatches and hatch covers extending across said hatch coamings, said hatch covers forming a part of said runway.

2. A cargo ship comprising a strength deck, tween deck storage compartments beneath said deck, a ramp, a runway extending along the deck, a turntable rotatably mounted on the deck contiguous to both said ramp and said runway, and elevator means operable between said runway and said tween deck storage compartments, said deck being provided with a plurality of hatch coamings defining hatches, hatch covers extending across said hatch coamings, and a plurality of raised deck sections around the periphery of the hatch coamings, said raised deck sections being contiguous to said hatch covers, said hatch covers and said raised deck sections each forming a part of said runway.

3. A cargo ship comprising a strength deck, tween deck storage compartments beneath said deck, a ramp, a runway extending along the deck, a turntable rotatably mounted on the deck contiguous to both said ramp and said runway, and elevator means operable between said runway and said tween deck storage compartments, said deck being provided with a plurality of hatch coamings defining hatches, raised deck sections around the periphery of the hatch coamings, and hatch covers extending across said hatch coamings flush with said raised deck sections, said hatch covers and said raised deck sections each forming a part of said runway.

4. A cargo ship comprising a strength deck, tween deck storage compartments beneath said deck, a ramp, a runway extending along the deck, a turntable rotatably mounted on the deck contiguous to both said ramp and said runway, and elevator means operable between said runway and said tween deck storage compartments, said deck being provided with a plurality of hatch coamings defining hatches and hatch covers extending across said hatch coaming, said hatch covers forming a part of said runway, said deck also being provided with a deck house engaging said deck at positions astraddle a center line tunnel through which said runway extends.

5. A cargo ship comprising a strength deck, tween deck storage compartments beneath said deck, a ramp, a runway extending along the deck, a turntable rotatably mounted on the deck contiguous to both said ramp and said runway, and elevator means operable between said runway and said tween deck storage compartments, said deck being provided with a plurality of hatch coamings defining hatches and hatch covers extending across said hatch coamings, said hatch covers forming a part of said runway, said elevator means comprising a forward elevator and an aft elevator, each of said elevators forming a portion of said runway in the raised position and lowerable for cargo stowage.

6. A cargo ship comprising a strength deck, a plurality of hatches in said strength deck, a plurality of hatch covers, each of said covers adapted to cover a respective hatch, a plurality of tween deck compartments beneath said deck, an aft elevator operable between the strength deck and the stern tween deck compartments, a forward elevator operable between the strength deck and the forward tween deck compartments, a ramp, a runway extending along said strength deck, and a turntable rotatably mounted on said strength deck in the stern of said ship, said turntable adapted to receive vehicles from said ramp and to rotate said vehicle for movement along said runway, said runway providing a surface on which said vehicles can be moved between said turntable and said elevators, said runway comprising raised deck sections and hatch covers, said raised deck sections being contiguous to said hatch covers to form a continuous runway suitable for vehicle travel.

7. A cargo ship comprising a strength deck, tween deck storage compartments beneath said deck, a forward elevator, an aft elevator, each of said elevators communicating between the strength deck and the tween deck storage compartments, a deck house having amidship tunnel, and an amidship runway extending between said elevators along said strength deck and through said tunnel, said deck being provided with a plurality of hatch coamings defining hatches, hatch covers extending across said hatch coamings, and raised deck sections contiguous to said hatch covers, said hatch covers and said raised deck sections forming a part of said runway.

8. A cargo ship in accordance with claim 7 which includes means for loading and unloading vehicles, said means comprising a turntable mounted on said strength deck contiguous to one end of said runway and a ramp mounted contiguous to said turntable.

9. A cargo ship in accordance with claim 7 which includes means for loading and unloading vehicles, said means comprising a stern ramp and a tunnel communicating between said stern ramp and said compartments.

References Cited in the file of this patent

UNITED STATES PATENTS

| | | |
|---|---|---|
| 2,120,751 | Jenney | June 14, 1938 |
| 2,247,146 | Baldwin | June 24, 1941 |
| 2,866,563 | Whitham | Dec. 30, 1958 |

FOREIGN PATENTS

| | | |
|---|---|---|
| 295,518 | Great Britain | Aug. 16, 1928 |